(No Model.) 2 Sheets—Sheet 1.
R. W. HUSS.
PNEUMATIC TIRE.
No. 495,974. Patented Apr. 25, 1893.
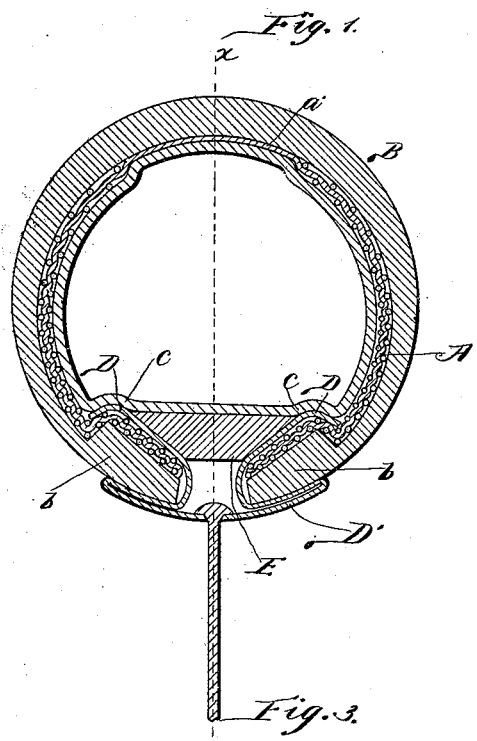
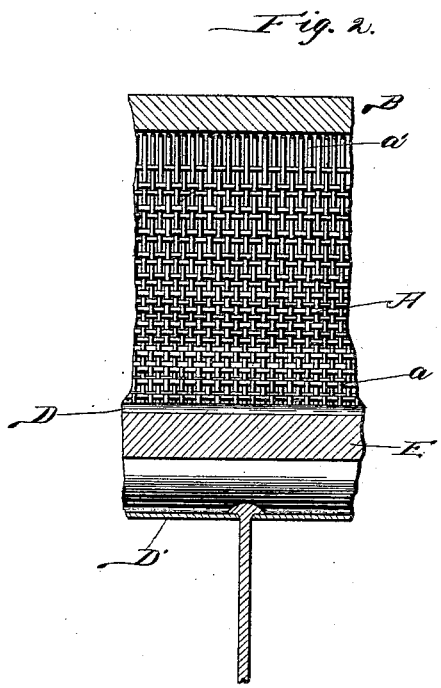
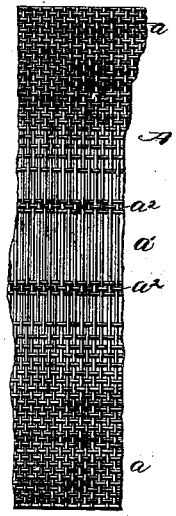
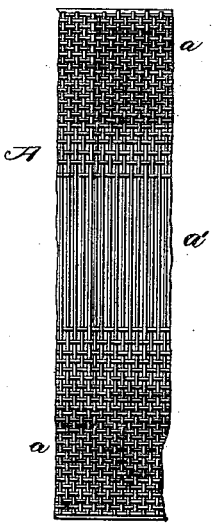
Witnesses
W. D. Middleton
R. W. L. Smith
Inventor
Rudolph W. Huss
By Chas. G. Page
Atty (No Model.) 2 Sheets—Sheet 2.

R. W. HUSS.
PNEUMATIC TIRE.

No. 495,974. Patented Apr. 25, 1893.

Witnesses
R. D. Middleton
Rita M. Wagner

Inventor
Rudolph W. Huss
By Chas. G. Page
Atty.

UNITED STATES PATENT OFFICE.

RUDOLPH W. HUSS, OF CHICAGO, ILLINOIS, ASSIGNOR TO HENRY A. LOZIER, TRUSTEE, OF CLEVELAND, OHIO.

PNEUMATIC TIRE.

SPECIFICATION forming part of Letters Patent No. 495,974, dated April 25, 1893.

Application filed August 8, 1892. Serial No. 442,438. (No model.)

*To all whom it may concern:*

Be it known that I, RUDOLPH W. HUSS, a citizen of the United States, residing at Chicago, in the county of Cook and State of Illinois, have invented a certain new and useful Improvement in Pneumatic Tires, of which the following is a specification.

My present invention is an improvement on that class of hollow or pneumatic tires (forming the subject of another application for Letters Patent filed by me October 16, 1891, Serial No. 409,282) in which the tread is reinforced by transversely arranged threads or thread portions, the object being to reinforce pneumatic tires for velocipedes and other vehicles, so that while the tread portion of the tire shall be rendered durable, properly resilient and as a result of the latter avoid prolonged depressions or indentations while running over obstacles along the road, there shall be no sawing and consequent wear of cross threads along such portion of the tire; and also to reinforce the tire proportionally to and with relation to its needs.

In carrying out my invention I reinforce the tire by a fabric which is woven so that its longitudinal or warp threads shall be omitted along all or so much of the peripheral or tread portions of the tire as may be desired. By such an arrangement the remaining portion of the tire can be reinforced by both warp and woof threads, while its tread portion which is subject to depressions or indentations during use, will be reinforced by cross or woof threads not tied together or directly subject to longitudinal or warp threads, and hence not subject to sawing action and wear, as a result of frequent depressions in the tire. The warp threads of the portion or portions of the reinforcing fabric formed by both warp and woof threads also serve to preserve uniformity in arrangement of the portions of the woof threads which are not crossed by warp threads, and also render it an easy and practical matter to weave a suitable width of such fabric of any desired length. I also provide certain details of arrangement, constituting matters of further improvement, as hereinafter set forth.

Figure 5:
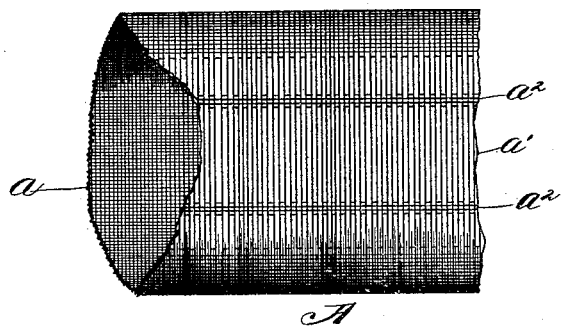
Figure 6:
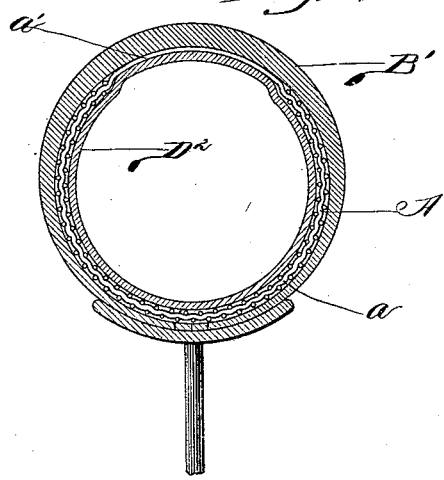

In the accompanying drawings, Figure 1 represents a section taken transversely through a pneumatic tire embodying my invention. Fig. 2 is a longitudinal section taken through a portion of the tire on X—X in Fig. 1. Figs. 3 and 4 represent portions of the fabric spread out and woven in accordance with my invention, as hereinafter explained. Fig. 5 represents a portion or length of the tube of woven fabric with the warp threads omitted along a portion of the same. Fig. 6 illustrates in cross section said tube arranged within a tire.

In the foregoing several figures the fabric is shown somewhat coarser than necessary in order to more clearly illustrate the way in which it is woven.

In Figs. 3 and 4 the portions of fabric A therein shown are each woven so as to omit along the middle of the fabrics a portion of the longitudinal threads which may be termed the warp threads, and in this way, the longitudinal side or edge portions *a* of the fabric are woven with both warp and woof, while the middle *a'* is formed by the woof with the warp omitted.

The fabric thus prepared can be woven in any desired length, and can be woven either in sheets or strips of suitable length and width, or as a preferred and exceedingly practical way and as a matter of further improvement it can be woven in tubular form and if desired the tube can be then split along the longitudinal middle of its portion which is woven with both warp and woof, the result being a sheet such as illustrated in Figs. 3 and 4.

In Figs. 1 and 2 the fabric formed as aforesaid, is incorporated in a tire so that the threads of its woof portion *a'* shall lie along the tread portion of the tire, while its warp and woof portions lie along so much of the remaining portions of the tire as it may be desired to reinforce with canvas or like fabric.

In the construction of tire shown, the fabric is united with the outer rubber tube or cover B and the air tube C is arranged within the tubular layer of canvas or fabric. But I do not confine myself to such precise arrangement or mode of incorporating the fabric A in a pneumatic tire, and I may also apply the same to any known or suitable construction of tire, observing, however, that in so applying the fabric, I arrange its portion $a'$ from which the longitudinal or warp threads are omitted, so as to reinforce the tread portion of the tire.

In the construction of tire illustrated, the tubular cover B is split and adapted along its edge portions $b$ for engagement with bent catch lips D formed along the wheel-rim $D'$, and the transverse form of the air tube is determined by a band or bearing E, and in such case the fabric can be applied to so much of the inner wall or side of the cover B as may be desired. But this particular construction of tire is simply given to illustrate the application of my invention, and hence I do not confine myself to the same, but may incorporate in any other desired form or construction of tire a tubular reinforcing fabric further illustrated in Fig. 5 and shown arranged within a pneumatic tire as in Fig. 6, or I can incorporate in any other desired form or construction of tire a part tubular reinforcing fabric which is woven so as to omit the warp or longitudinal threads along the tread portion of the tire, while therefore I have split the tube of woven fabric in Fig. 1 so as to open it along the seating portion of the tire, I can as hereinbefore mentioned use the tube of fabric as aforesaid without splitting it, and thereby incorporate or arrange within the tire a tube or tubular layer of woven fabric from which the warp threads are omitted along the tread portion of the tire. This tubular layer A is further shown in Fig. 5, and in Fig. 6 shown arranged within a pneumatic tire comprising the outer casing $B'$, the tubular layer A of fabric, and the air tube $D^2$, it being obviously unnecessary to multiply illustrations of the multitude of constructions of tires in which my invention can be embodied.

By the foregoing arrangement I not only reinforce the tire, but so construct and arrange the threads of its reinforcing fabric that there shall be no sawing and wear between crossing threads along the tread portion of the tire. At the same time, while there is an absence of crossing threads along the tread portion of the tire, the single cross or woof threads there present, will so reinforce the tread as to avoid prolonged depressions in the tire while running over obstructions, and at the same time secure all resiliency necessary to speed and which are easy riding.

While the warp and woof portion or portions of the fabric can be woven evenly, I prefer as a matter of further improvement to weave the same so that before dropping the warp threads altogether, they shall be laid at increasing distances apart so as to lie at increasing distances toward the tread portion of the tire as shown, and in this way I avoid an abrupt transition from the warp and woof portions $a$, to the woof portion $a'$. I may also weave in a few supplemental warp threads $a^2$, as in Fig. 3, in order to preserve regularity in the arrangement of woof threads, but with such arrangement the tire will still be provided with a reinforcing fabric from which the warp threads have been omitted along its tread portion. I may also incorporate any desired number of such layers of reinforcing fabric within the tire, and place the same either together, or separate them in accordance with the construction of tire involved, and I may also embed and incorporate such reinforcing fabric or arrangement of threads within or apply the same to a layer of unvulcanized rubber and then vulcanize the same as will be readily understood by those skilled in the art, without further description.

I do not herein broadly claim a hollow or pneumatic tire in which the tread is reinforced by transversely arranged threads or thread portions; nor a pneumatic tire reinforced along its tread by cross threads and along its remaining portion or portions by heavier or stouter material; nor a pneumatic tire in which the reinforcing cross threads for the tread are united by an elastic connection so as to be separable from one another to the extent of the elastic yield or stretch of such elastic connection lengthwise of the tread. These features broadly considered form the subject of other applications in my name for Letters Patent now pending in the United States Patent Office. But What I here claim, and desire to secure by Letters Patent, is—

1. In a pneumatic tire, a reinforcing fabric from which the longitudinal or warp threads are omitted along the tread portion of the tire, substantially as described.

2. In a pneumatic tire, a reinforcing fabric having the longitudinal or warp threads arranged at increasing distances apart toward the tread portion of the tire and omitted along such tread portion, substantially as described.

3. A pneumatic tire comprising a reinforcing fabric united with a layer of rubber and having its longitudinal or warp threads omitted along the tread portion of the tire, substantially as described.

4. A reinforcement for pneumatic tires consisting of a tube of woven material having a portion of the warp threads omitted so as to provide it with a width of reinforcing material composed of transverse threads, substantially as and for the purpose described.

5. A pneumatic tire provided with a tubular reinforcing fabric having its longitudinal or warp threads omitted along the tread portion of the tire, substantially as described.

6. A pneumatic tire comprising an outer tubular cover, an inner tubular layer of reinforcing fabric having its longitudinal or warp threads omitted along the tread portion of the tire, and an air tube arranged within such tubular reinforcing fabric, substantially as described.

7. A fabric for reinforcing pneumatic tires, woven with a longitudinal portion $a'$, from which the longitudinal or warp threads are omitted and adapted to reinforce the tread portion of the tire, the remaining portion of the fabric involving both warp and woof threads being adapted for reinforcing the remaining portions of the tire, substantially as described.

RUDOLPH W. HUSS.

Witnesses:
CHAS. G. PAGE,
W. D. MIDDLETON.